March 24, 1936.                D. S. DE LAVAUD                2,034,977
                               BRAKE FOR VEHICLES
                               Filed Nov. 18, 1929          3 Sheets-Sheet 1

D. S. de Lavaud
INVENTOR

March 24, 1936.  D. S. DE LAVAUD  2,034,977
BRAKE FOR VEHICLES
Filed Nov. 18, 1929  3 Sheets-Sheet 3

D. S. de Lavaud
INVENTOR

By: Marks & Clerk
ATTYS.

Patented Mar. 24, 1936

2,034,977

UNITED STATES PATENT OFFICE 2,034,977

BRAKE FOR VEHICLES

Dimitri Sensaud de Lavaud, Paris, France

Application November 18, 1929, Serial No. 408,125
In France May 27, 1929

1 Claim. (Cl. 188—78)

The present invention relates to block brakes, and has for its main object to eliminate a serious inconvenience existing in these brakes.

This inconvenience, which particularly occurs when a powerful auxiliary braking action is required, consists in that the blocks or segments after a certain degree of wear of the linings, present a tendency to a propping action, producing immediately the contact is made an intense braking action, which might even cause jamming, destroys all progressive application of the brake. In this case the brake is said to be "engaged".

The present invention completely eliminates any possibility of "engagement" of the brakes; it is mainly characterized in that the segments have no connection with the fixed cheek, with the exception of an abutment giving a fixed or an approximately fixed direction of reaction.

In the accompanying drawings, given by way of example only.

Figure 7 is a sectional plan view made according to line III—III of Fig. 5.

Figure 1:
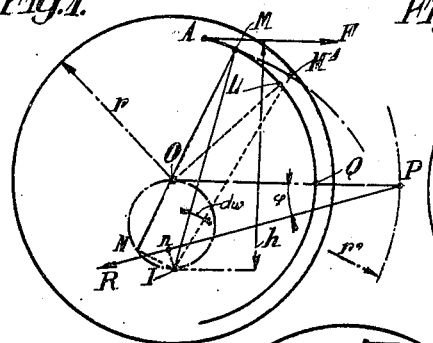
Figure 1 is a diagrammatic view of a brake provided with a segment pivoted in the known manner.
Figure 2:
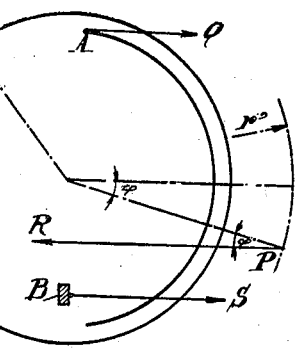
Figure 2 is a diagrammatic view of a brake in accordance with the invention.

In brakes of known type, such as that diagrammatically illustrated in Fig. 1, the brake segment is pivoted on the fixed cheek. This pivotal connection can be constituted by a simple trunnion, as shown in Fig. 2, or by a double abutment, that is to say for instance according to two perpendicular places. These two means are equivalent, in this sense that the reaction given by the trunnion or the double abutment can have any direction. The non-determination of this direction is the cause, as shown hereinafter, of the inconveniences mentioned at the beginning of this specification.

It is necessary to find the distribution of the stresses on such a brake segment at the time braking action is exerted.

For that purpose, the location of the center of pressure on the segment will first be determined, assuming the contact is initially ensured between the latter and the drum according to a perfectly cylindrical surface.

Let O be the center of the drum, I the pivotal point of the brake segment, and M any point of contact between the segment and the drum. The angle between the straight lines OM and IM is $\alpha$.

It will be assumed that the segment tends to rotate according to an angle $d\omega$. The point M comes at $M_1$ and one has:

$$MM_1 = IM d\omega.$$

The radial displacement $LM_1$ of the point M is clearly equal to:

$$MM_1 \sin\alpha$$

since $MM_1$ is perpendicular to IM and LM perpendicular to OM. One has therefore:

$$LM_1 = IM \sin\alpha \, d\omega$$

But:

$$IM \sin\alpha = IN$$

IN being the perpendicular dropped from I on MO.

The radial displacement of a point M is therefore function of IN; the location of the point N is a circumference having a diameter IO. The maximum of this radial displacement will therefore occur when the point N is at O, that is to say for the point Q located on OQ, perpendicular to OI.

The center of pressure is therefore located on the straight line OQ; on the other hand, if $r$ represents the radius of the drum, it is known that the centers of pressure are located on a circle having O for center and $r'$ for radius, such that:

$$r' = r \frac{\text{arc of contact}}{\text{chord sub-tending this arc}}$$

The center of pressure is therefore initially at P. When the braking takes place, the reaction of the drum on the brake segment is directed according to PR which forms, with OP, the friction angle $\gamma$.

Let A be the point of application of the braking force and F this force. The equation of the moments relatively to I gives therefore:

$$Fh = Rn$$

from which:

$$R = F \frac{h}{n}$$

The reaction R, and consequently the braking torque, is therefore correspondingly increased as r is reduced. The auxiliary braking action depends therefore from the position given by the manufacturer to point I. But it is impossible to carry on the action too far, that is to say to bring the point I very near the resultant of pressure R, as the sensitiveness of the brake becomes too great, and the engagement of the brake rapidly takes place.

In fact, the wear is produced particularly in the region of the point Q, since it is there that the greatest radial displacement occurs. It will then happen that the center of pressure P will rise above the diameter OQ, particularly if the brake segment slightly yields. The resultant R then comes nearer to I, and the engagement, (that is to say the propping action) takes place. Moreover, this engagement can occur quite as well if the center of pressure P sufficiently passes below the diameter OQ, as is the case after wear of the upper part of the brake segments.

The possibility of engagement of the brake, is therefore due to the fact that the center of pressure can displace itself.

The principle of the invention consists in introducing a supplementary condition which fixes the position of this center of pressure; for that purpose, the articulation or joint I (which does not determine the direction of the reaction passing through this point) is replaced by an abutment imposing to the said reaction a definite direction, preferably parallel to that of the stress F.

As shown in Fig. 2, in case the reaction S of the abutment B on the brake segment is parallel to the stress F, it will be seen that during the braking action the reaction R of the drum upon the segment is parallel to F and to S; on the other hand, it forms the friction angle $\gamma$ with the radius OP, P being the center of pressure; finally, P is located, as previously, on the circle having r' as radius. The position of the point P is therefore absolutely determined and fixed, this excluding any possibility of engagement of the brake, whatever may be the intensity of the initial auxiliary braking effect.

Figure 3:
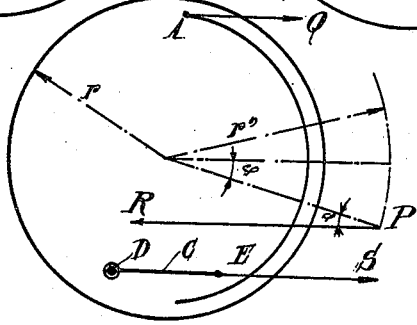
Figure 3 is a diagrammatic view of a second form of brake.

The abutment directing the reaction B can be constituted in any suitable manner; it can be formed by a fixed plane surface. It can also be constituted by a small link C pivoted at D on the brake segment and at E on a fixed point (Fig. 3). The direction of the reaction S always passes through the points D and E; the position of the latter does not practically vary. It will be seen that this direction is fixed.

In the case of segment brakes in which the segments, connected together, are not jointed on a fixed point, the segments can be preferably connected together by a small link pivotally connected to each of them and having no other connection, the disengaging segment abutting on a surface which gives to the reaction a fixed direction. In other words, the two above indicated abutting methods for directing the reaction are in this case combined.

Figure 4:
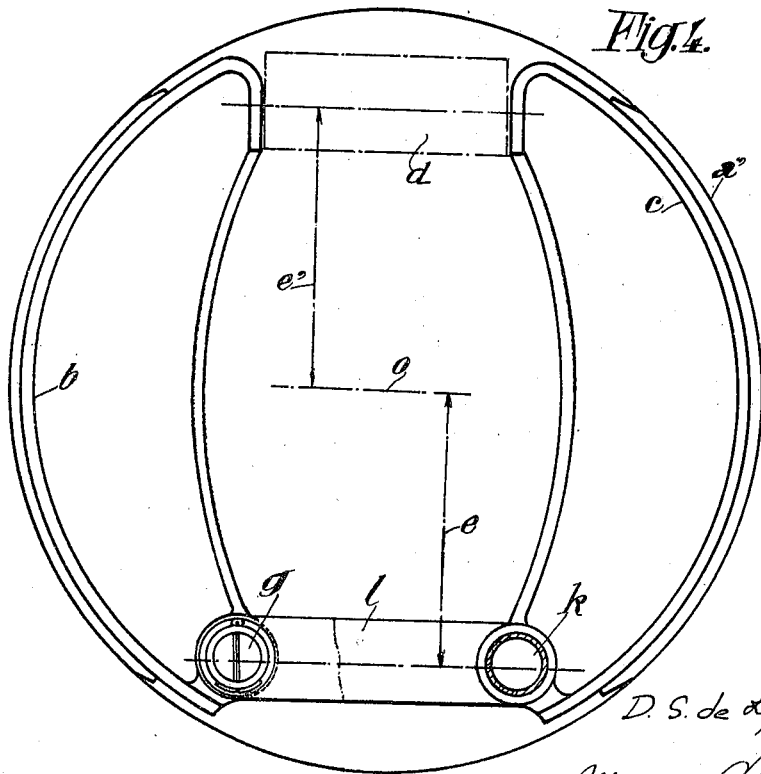
Figure 4 shows a form of construction of this second type of brake.

Figure 4 diagrammatically illustrates a brake of this type.

In this example, the brake drum is shown at a' and the brake segments at b and c. These segments are returned by a spring in the usual manner, and they can be spaced apart by a suitable control system, placed at d.

But, whilst in the known brakes, the segments b and c are connected by a floating joint, these segments are connected by an elongated connecting member, such as a link l, pivotally connected at g to the segment b and, at k, to the segment c. Preferably the control system d bears against the parallel ends of the segments, which, incidently are arranged at right angles to the longitudinal axis of the link l.

In these conditions, as previously set forth, the center of pressure for the brake segment c is fixed, since the reaction directed according to g—k is parallel to the stress exerted by the system d on this segment. Likewise, the center of pressure for the brake segment b is also fixed, since the reaction on d is parallel to the stress transmitted to the brake segment b by the link l. It will be very easily calculated by writing that the moments are null relatively to k, concerning the segment c, and relatively to g, concerning the segment b, that the auxiliary braking effect depends on the distance e from the center O to the link l, and on the distance e' from the center O to the system d.

Constructional particularities of the invention are described hereinafter with reference to Figs. 5 to 8.

These particularities mainly consist:

(a) In utilizing for controlling the spacing apart of the brake segments, a hydraulic receiving device of the type having two opposite pistons with a single mechanism for taking up play which, preferably, will be arranged on the inlet piston in the direction for forward running.

The advantage of utilizing two opposite pistons resides in the fact that the braking control is as smooth for backward running as for forward running. If, on the contrary, the back brake segment (that is to say the second segment from the brake applying device, in the direction of rotation in forward running) for forward running, bears against a fixed abutment, the control is rendered very hard for backward running, owing to the wedging which takes place in this case on the piston.

(b) In applying on the back brake segment, for forward running, and adjacent to the hydraulic piston, a hand brake cam having a tangential or approximately tangential section, in order to prevent the brake segment from forming a wedge and producing the breaking of the axis of the cam or plate.

(c) In eventually replacing the link connecting the brake segments by a resilient blade secured at its ends to the said segments, and for instance inserted into the same at the time they are being cast; the resilient return of the segments can then take place only by means of this blade, but a spring can also act at the same time between the segments, in the known manner.

(d) In protecting the hydraulic receiving system against the action of heat which is transmitted thereto by conduction or radiation. A particular importance is attached to this improvement, the interest of which is fundamental. In fact, the rubber caps of the hydraulic system would greatly suffer from the heat which would be transmitted without this precaution considered as indispensable.

(e) In obtaining this protection by one of the means hereinafter indicated, or by their combinations:

The receiving system is placed as far as possible from the inner surface of the brake drum;

The ends of the pistons are provided with insulating washers, which are bad conductors of heat (fibre, moulded ferrodo, or the like) and, generally speaking, the parts of the receiver capable of allowing the transmission of calories by conduction are insulated by a suitable heat insulating materials;

The pistons are made hollow, in order to limit the section of conductibility, of the calories, and to oppose a greater resistance to the afflux of calories by conduction;

Between the receiver and the drum is arranged one or more screens which do not allow the passage of heat, and for instance a chamber freely open to the external air which can circulate therein, in order to avoid the afflux of calories by radiation.

(f) In extending the segments, at the lower part, as far as possible beyond the joints of the links or of the points where the resilient blade is secured, this arrangement presenting the following advantages:

(1) It ensures a better centering of the floating segments;

(2) It regulates the wear. In fact, the latter tends to accentuate at the level of the joints or pivots, where the auxiliary braking stress is at the maximum. If the tongues are not extended, the segments are loose and slide towards the lower part. In these conditions, the auxiliary braking stress further accentuates at the lower part, the pressure diminishing towards the upper parts of the segments.

It will be understood that the extension of the tongues to the lower part distributes in a better manner the pressure stress opposite the joints or pivots, prevents the segments from moving downward and, consequently, regulates the wear.

(g) In providing a device reducing the wear of the linings to and avoiding injury of the metal of the segments.

With the automatic slack-adjuster used, the driver cannot ascertain the degree of wear of the segments, as he always notes the same braking power for the same position of the pedal. Consequently, without control means, he can wear out the segments until the lining, and the rivet heads disappear, and even until the metal is attacked.

This wear of the metal particularly occurs near the joints or pivots, resulting in a flat portion when placing in position new linings; the segments descend too far and do not satisfactorily bear towards the inlet and the outlet. An unequal wear results therefrom, which always tends to accentuate near the joints or pivots. The driver's attention should therefore be drawn to the fact that the linings are nearly worn out.

Various methods can be provided for obtaining this result. It is possible, for instance:

To limit the action of the automatic slack adjuster. The driver is then aware, by the abnormal amplitude of the pedal that the wear accentuates.

To make provisions in order that the stress of the pedal becomes more intense at the end of the wear. Several means may be utilized to obtain this result, among which the following one can be cited by way of example:

On the spring for restoring the segments is placed (when such a spring exists) a small bar which blocks or locks a number of turns when the opening stroke of the said segments exceeds a certain value. The driver then notices an abnormal resistance.

In case the link connecting the braking segments is replaced by a resilient blade effecting itself the returning or restoring action of these latter, without use of a spring, it is then possible to arrange, at the upper part, a slightly resilient abutting tie-rod, which limits the spacing apart of the segments.

(h) In combining together the above mentioned features.

The brake illustrated is a brake having segments 1 and 2 acting on a drum 3. The body or frame 4 of the hydraulic receiver is mounted, by means of two lugs 5 and 6, on the fixed casing enclosing the brake drum. On one of the faces of the plane defined by the lugs 5 and 6 is provided a boss 7 perforated with a hole so arranged as to receive the coupling of an inlet pipe line for a fluid under pressure.

A chamber 8, of spherical shape, adapted to receive this fluid, is formed by two caps 9, made of rubber or equivalent material, and provided with flanges 10 and 11, held in position by clamping by means of washers 12. On each of these washers bears a screw-threaded member 13 extending into a corresponding internally screw-threaded portion 14 of the frame. On the other hand, each washer 12 can receive with slight friction, a spherical cap 15 covering the corresponding rubber cap. On the inlet side, in the direction of forward running, the spherical cap 15 is provided with a centering rod 16 sliding in a sleeve 17. The latter is screw-threaded and receives a nut 18 having radial axes 19 (in any number, three for instance) on which pawls 20 are pivoted. These pawls are held by a flexible rod 21 which fits, at one of its ends, in a hole of the said pawls, and at the other end, in a corresponding hole of a collar 22 rigid with the nut 18. The pawls 20 are in engagement with radial teeth 23 arranged on the member 13.

Within the bore of the members 13—13' slides a piston 29—29' which acts on one of the braking segments through the medium, according to the present invention, of washers 30—30' made of heat insulating material. The piston 29 acting on the front segment (that is to say the first segment from the brake applying device, in the direction of rotation in forward running), and included in the automatic adjusting device, is prevented from rotating by a finger 31 entering a longitudinal groove of the piston. It is necessary, as previously set forth, to protect the rubber caps 9 against the heat created by the braking frictions. It is for that purpose that the two washers 30—30', made of heat insulating material, have been arranged at the end of each of the pistons, for the immediate contact of the adjusting mechanism with the segments. On the other hand, it is to be noted that the hollow shape given to the pistons acts to the same end.

Besides for preventing the effects of propagation of heat by radiation, between the drum and the adjusting mechanism is provided a screen 32 constituted, in this example, by a chamber freely open to atmospheric air, and in which the air can circulate.

Figure 5:
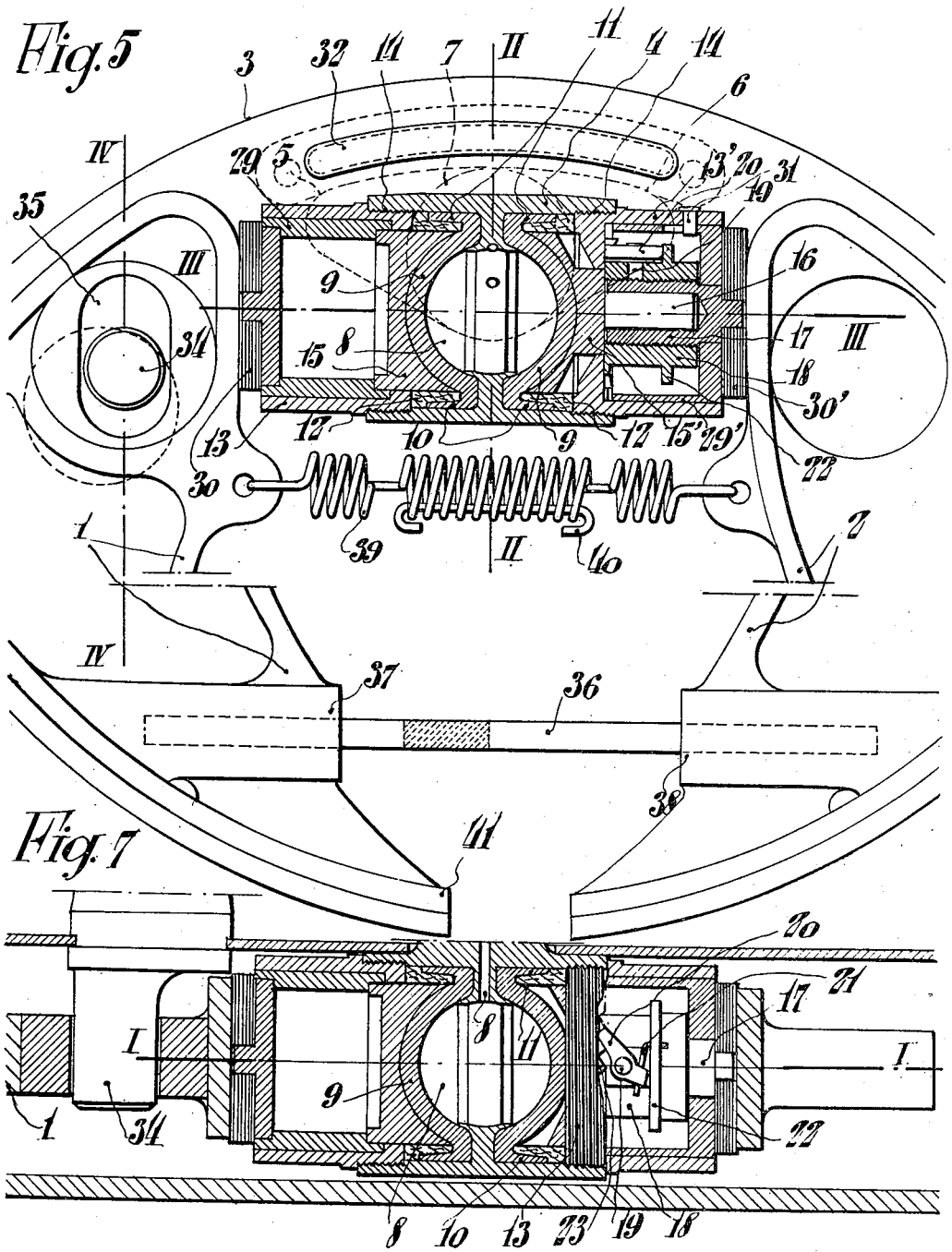
Figure 5 is a front sectional view made according to line I—I of Fig. 7.
Figure 6:
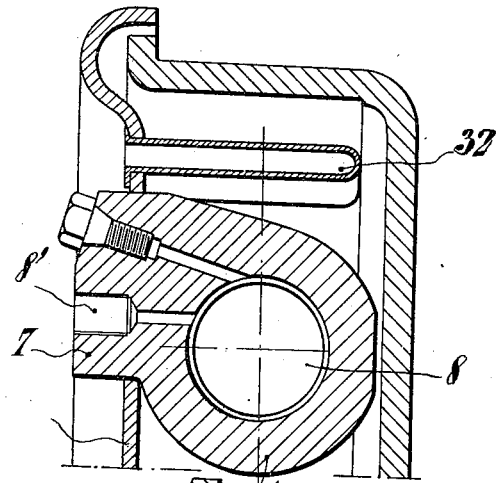
Figure 6 is a corresponding left-hand sectional view made accordance to line II—II of Fig. 5.
Figure 8:
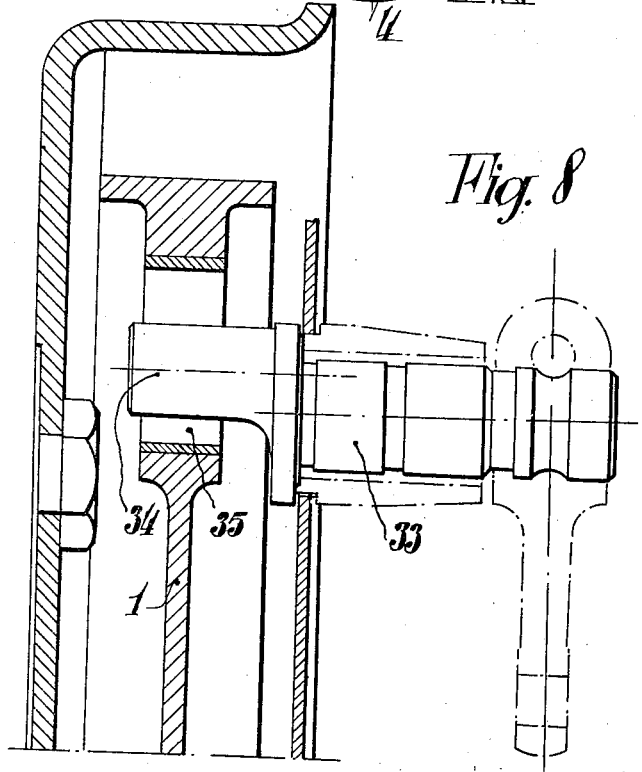
Figure 8 is a section made according to line IV—IV of Fig. 5.

Finally, on the spring for returning the segments is illustrated, in Fig. 5, a small bar 40 adapted to block or lock a number of turns when the opening stroke of the said segments exceeds a definite value. In the same figure, the tongues of the segments are extended to the lower part, at 41.

The operation of the automatic adjusting mechanism is as follows:

At the time of braking, the fluid under pressure enters through the orifice 8', into the chamber 8. The spherical rubber caps swell and displace the pistons 29 and 29' which, through the medium of the heat insulating washers 30, 30', act on the segments 1 and 2. It is to be noted that the nut 18 has no tendency to rotate on the sleeve 17, as the pitch of the screw-threaded portion is small. As previously indicated, the corresponding piston 29, is prevented from rotating.

During the movement of the piston 29, the spring 21 holds the pawl in contact with the flank of the tooth 23 with which it is in engagement.

If the curvature of the piston, owing, for instance, to the wear of the brake linings, exceeds the predetermined maximum, the pawl 20 moves out of engagement with the tooth 23 under the action of the spring 21 which causes it to rotate to a sufficient extent for bringing it opposite the following tooth. At the time of releasing the brakes, under the action of the resilient blade, or of the spring for returning the segments, according as one or the other of these elements are used, the piston 29 is brought back as well as the nut 18. The pawl 20 engages itself in the next tooth and when released causes nut 18 to rotate. The propping action has for effect to force the nut 18 to rotate for taking up the play due to wear.

The invention also relates, as indicated, to a hand control mechanism having a direct tangential action and acting on the back segment.

This control is effected through a cam which, in the example illustrated in the accompanying drawing, is constituted by an eccentric axis 33 connected, by any suitable rigging, to a lever within reach of the driver. The trunnion 34 of this axis moves in an eye 33 provided on the back segment.

The operation of the eccentric axis results in a direct tangential action on the back segment, thus avoiding the violent stresses which might be created by the wedging of the segment between the axis and the brake drum if this precaution was not taken. On the other hand, it will be understood that any eventual play is automatically taken up as soon as the automatic braking system is again acted upon.

The segments 1 and 2 are connected, at their lower part, by a resilient blade 36 which plays the same part as the link previously described. This blade 36 is secured, at its ends, at 37 and 38, in the segments 1 and 2, and for instance inserted at the time they are being cast. This arrangement operates in the same way as the link above described. The resilient return of the segments 1 and 2 can be ensured by the blade 36 alone, or by the combination of this blade with the usual spring 39.

What I claim as my invention and desire to secure by Letters Patent, is:—

A brake comprising a brake drum, two free floating brake shoes, an elongated connecting member between adjacent ends of the brake shoes, said brake shoes having their other adjacent ends arranged parallel to each other and at right angles to the longitudinal axis of said elongated connecting member, stop means for limiting the rotation of the shoes, said means comprising a fixed member having stop surfaces, two slide blocks rectilinearly guided in said fixed member along a chord of the drum each bearing respectively on an adjacent end of the brake shoes and one of which blocks bears on one stop surface of the fixed member, an intermediate member interposed between the other slide block and the other stop surface and having an expansible but irreversible connection with said slide block, floating means for actuating said slide blocks, and means for causing an adjustment of the connection between the intermediate member and the corresponding slide block when the movement of the slide block exceeds a predetermined value.

DIMITRI SENSAUD DE LAVAUD.